March 14, 1967    J. R. KELCHNER ET AL    3,309,237
QUICKLY REMOVABLE THERMOCOUPLE ASSEMBLIES
Filed May 22, 1964    2 Sheets-Sheet 1

March 14, 1967   J. R. KELCHNER ET AL   3,309,237

QUICKLY REMOVABLE THERMOCOUPLE ASSEMBLIES

Filed May 22, 1964   2 Sheets-Sheet 2

United States Patent Office 3,309,237
Patented Mar. 14, 1967

3,309,237
QUICKLY REMOVABLE THERMOCOUPLE
ASSEMBLIES
Jay R. Kelchner and Marcel G. Verrando, Cortland, N.Y., assignors to Pall Corporation, Glen Cove, N.Y., a corporation of New York
Filed May 22, 1964, Ser. No. 369,443
10 Claims. (Cl. 136—221)

This invention relates to thermocouple assemblies and more particularly thermocouple assemblies that are quickly and easily installed in and removed from any type of receptacle.

Thermocouple design has not varied appreciably over the past thirty years. Such assemblies normally include as essential components a receptacle extending into the system whose temperature is to be measured, and fastened thereto a housing sheltering the thermocouple sensing element and associated electrical connections. The sensing element extends into the receptacle and is fastened to the housing while the housing itself is usually threadably or otherwise mounted on the receptacle.

Thermocouple assemblies frequently must be placed in inaccessible or dangerous positions, since they must be placed at exactly the point where the temperature is to be measured. Moreover, when the system is subject to extreme variations in temperatures, it is necessary to insert in sequence a plurality of the thermocouple sensing elements of more limited range to detect temperatures within the limits. This means that a thermocouple assembly frequently must be changed rather rapidly when the temperature gives signs of exceeding the limited range of the thermocouple in use. As a result, there has arisen a need for a thermocouple assembly which can be quickly and easily installed and removed.

It is preferred that the sensing element be mounted in a manner to prevent vibration or rotation so as to prevent damage to the electrical connections or the development of a short circuit. If the sensing element is allowed to move excessively in the receptacle, the accuracy of the temperature measurement may be greatly reduced. In existing thermocouple assemblies, the insertion of the sensing element in the receptacle usually requires the attachment of the mounting block to the housing by bolts and nuts or other permanent fasteners.

To insure rapid and accurate response to any change in temperature, the thermocouple sensing element should be installed so that it will remain in continuous contact with the protective receptacle in which it is encased during any contraction and expansion due to varying temperatures. Another advantage secured through direct contact of the thermocouple element with the protective housing is positive electrical grounding of the device. Grounding of the sensing elements becomes especially important when using modern high-speed logging equipment. Stray electrical signals will readily cause erroneous readings from an ungrounded element.

In accordance with the invention, thermocouple assemblies are provided comprising, in combination, a temperature sensing element, mounting means therefor, and bias means operatively connected to the mounting block, and retaining means on the bias means, biased thereby to engage a matching retaining portion in a thermocouple housing, the retaining means being movable into and out from engagement with the matching portion of the housing in a quick snap action by application of force to the bias means against the biasing action thereof. The thermocouple assemblies of the invention in a preferred embodiment comprise, in combination, a mounting block having an aperture therethrough, a tubular insert mounted in the aperture, a temperature sensing element mounted in the insert, and bias means having a retaining means attached and movably mounted on the insert, the retaining means being biased by the bias means to engage a matching portion on a housing for retaining the assembly in the housing.

As a further feature, supplemental bias means can be provided to retain the sensing element against a wall of the receptacle in which the assembly is mounted for fast and accurate temperature measurement and for positive contact for electrical grounding purposes.

The housing is adapted for mounting on or in any type of receptacle such as a thermowell, a pipe-type protective tube, or a blind receptacle such as a bearing or mold block.

The bias means and retaining means can be any of the well-known bias means and retaining means with which those skilled in this art are acquainted. A spring clip can be used which is adapted to engage a corresponding retaining portion in a thermocouple housing and which can be manually disengaged therefrom. A bowed Belleville washer or coned spring can be used which is adapted to flex and change the direction of bow during insertion and removal of the thermocouple assembly. The outer periphery of such a washer or spring is adapted to engage a retaining lug or flange, thereby retaining the sensing element in the housing, but to flex and change direction of bow so that it can be withdrawn over the lug in removing the thermocouple assembly from the housing.

Another type of bias and retaining means that can be used to permit quick attachment of the thermocouple assembly to the housing, and quick removal therefrom is a permanent magnet or electromagnet, adapted to couple with an armature or a second magnet to retain the thermocouple assembly in the housing. Other variations will be apparent from the above description.

The thermocouple assembly of the invention, in addition to the bias and retaining means, incorporates a temperature sensing element of conventional type. A preferred type of thermocouple element is a metal-sheathed cable containing thermocouple wires which are insulated by a hard-packed, inert metallic oxide. These are available under the trademark Trinox. Sheath materials include copper, aluminum, tantalum, steel, Inconel and stainless steel, and the thermocouple materials include copper - constantan, iron - constantan, Chromel - Alumel, platinum and platinum-rhodium as well as many other suitable materials. The standard insulation material is magnesium oxide, but materials such as aluminum oxide, beryllium oxide or zirconium oxide also can be used. The thermocouple junction can be exposed, or closed and grounded in contact with the sheath, or closed and ungrounded with the thermocouple insulated from the sheath, as may be required.

The thermocouple sensing element is conveniently attached to a mounting block to support the element and the electrical connections therefor. The block may be made of metal, such as aluminum, steel, or stainless steel, or plastic such as polytetrafluoroethylene, polyoxymethylene, polycarbonate, and polychlorotrifluoroethylene resin.

The housing in which the temperature element is attached is also of generally conventional design, and is attached to the receptacle by any desired means. In most cases, the housing is threadably mounted on the receptacle, i.e., thermowell, by either internal or external threads, depending upon the dimensional requirements of the system. A bayonet-type joint can also be used, as well as a press-fit joint, staked or swaged joint or attachment with a locking device, i.e. a locknut. The housing can also be permanently mounted to the receptacle, inasmuch as the thermocouple assembly of the invention is readily removed from the housing, so that the housing one installed need never again be disturbed until the receptacle itself is replaced or moved. The housing can be of plastic, such as any of the materials mentioned above for the mounting block, or of metal, such as stainless steel.

The supplemental bias means is normally a coil or leaf spring. Because of the convenience of installation, a Belleville washer can also be used.

The drawings illustrate preferred embodiments of the invention.

Figure 1:
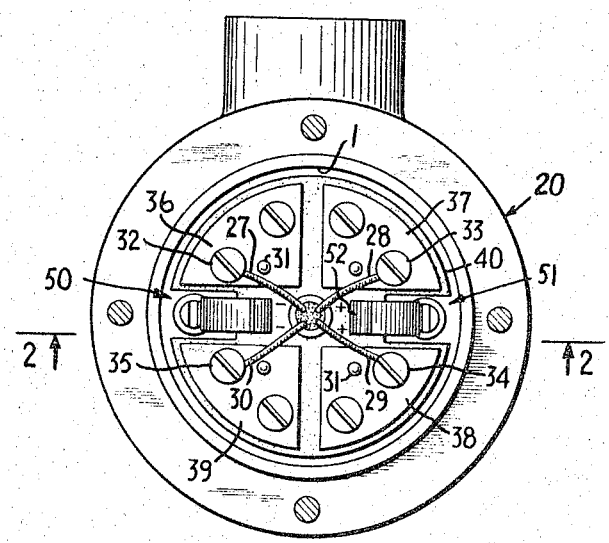
FIGURE 1 is a top view into a housing incorporating a thermocouple assembly of the invention, the housing cover having been removed for a better view.
Figure 2:
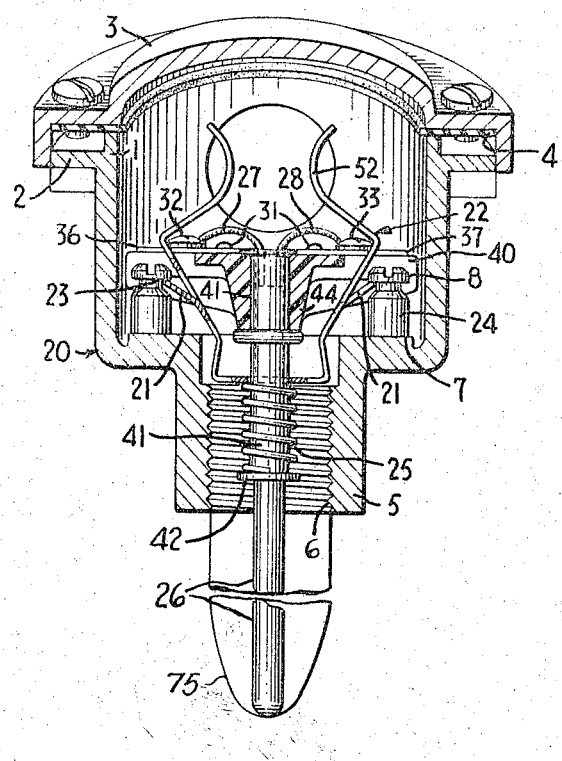
FIGURE 2 is a cross-sectional view of the thermocouple assembly of FIGURE 1, taken along the the line 2—2 and looking in the direction of the arrows.

The thermocouple assembly of FIGURES 1 and 2 comprises a housing 20 open at both top and bottom. The open top end of the housing 1 is fashioned with a flange 2 adapted to engage a cover 3. A gasket 4 is snugly engaged between the cover and the top end of housing 2 in a leakproof seal. Both the housing 20 and the cover 3 may be made of aluminum, and the gasket is made of Viton A, rubber, or asbestos. Other suitable material may of course be used.

The lower portion of the housing terminates in an internally threaded tubular portion 5, the threads 6 of which are adapted to be threaded over an externally threaded receptacle such as a thermowell 75. A horizontal shelf or ledge 7 is formed between the upper portion of the housing of greater diameter and the lower tubular portion, and at the periphery of this ledge are mounted two retainer posts 24 fitted with screw heads 8 threadably mounted in the posts and which can be raised or lowered simply by rotation in their sockets. The heads 8 define flanges 23 beneath them, which constitute the retaining portion for the bias means in accordance with the invention. Alternatively, the screw heads 8 may be rigidly fixed onto the posts 24, and the posts may be threadably mounted or riveted in the ledge 7.

The thermocouple assembly of the invention includes a mounting block 40 made of Delrin polyoxymethylene resin, but any other plastic or metal could also be used. The mounting block 40 is pierced by a central aperture through which is inserted the sleeve 41 within which is placed the sheather thermocouple sensing element 26. The sheathed element 26 may be joined to sleeve 41, or they may be combined into a single element. The sleeve 41 is rigidly joined to block 40 by press-fitting or by swaging or staking. Four terminal screws 32, 33, 34 and 35 are threadably inserted into terminal plates 36, 37, 38 and 39 respectively. The terminal plates are in turn attached to the block 40 by means of eyelets 31. Junction leads 27, 28, 29 and 30 are held in electrical connection to the terminal plates by these screws. These leads are covered with fiber glass and color coded for convenience in wiring.

The outer periphery of the block 40 is provided with two recesses 50 and 51 for reception of the retainer posts 24, and the upwardly extending arms 52 of a spring clip 22 made of stainless steel, but other spring metal or plastic could also be used, such as polypropylene, polyethylene, and nylon. The arms 52 are provided with outwardly extending lugs 21 adapted to engage the lower face of the flange 23. The lower extremity of the clip 22 is provided with a central aperture through which passes a sleeve 41 encircling the sensing element sheath 26.

The sleeve 41 terminates in a shoulder 42, and constrained between the shoulder 42 and the spring clip 22 is a compression coil spring 25, which encircles the sleeve 41. The spring 25 thus tends to force the clip upwardly and to firmly engage the lugs 21 beneath the flanges 23, when the thermocouple is inserted in its receptacle so that the tip is in contact with the bottom of the receptable, thereby retaining the clip and with it the thermocouple assembly within the housing 20. Other bias means may of course also be used, e.g. a Belleville washer.

It will be apparent that the length of the sheath and the thermocouple sensing element are adjusted to match the length of the receptacle such as the thermowell. The sensing element should be long enough so that the tip of the sheathed element 26 tightly engages the wall of the receptacle for proper locking action of the spring clip 22 as well as for fast and precise temperature measurement. The spring engagement of the lugs 21 against the flanges 23 ensures that the thermocouple sensing element will be firmly secured, and will not rotate nor vibrate.

It will be apparent from the above description that the thermocouple assembly is readily removed and mounted in the housing merely by pressing together the upstanding ends 52 of the spring clip 22. To remove the assembly from the housing the spring clip is pushed slightly downwardly against the action of the spring 25, and then the ends 52 are pressed together. The lugs 21 are then disengaged from the flanges 23. The thermocouple assembly can then be withdrawn.

The assembly can be inserted in the housing simply by pressing together the top ends 52 of the clip 22 and thrusting the sensing element into the open tubular portion until the lugs 21 are beneath the flanges 23. Release of the clip will then permit the flange lugs 21 to engage the flanges 23, and they will be securely held in this position by the action of the spring 25 against the lower face of the clip 22.

In the device shown, all metal parts except the head and mounting block are preferably of stainless steel to resist corrosion. The head and housing are preferably of aluminum and the mounting block is preferably of polyoxymethylene resin. However, other metals and plastics can be used.

Figure 3:
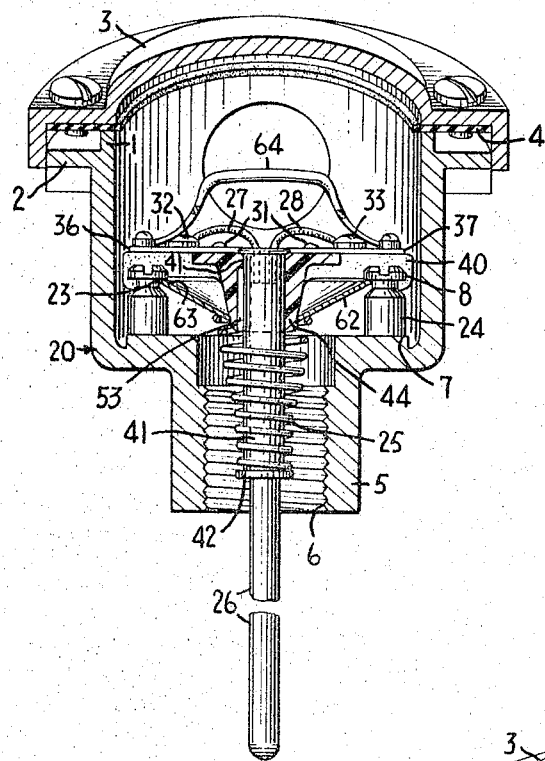
FIGURE 3 is a cross-sectional view of a further embodiment of thermocouple assembly in accordance with the invention, employing a Belleville washer as the bias retaining means, in lieu of a spring clip.

The thermocouple assembly of FIGURE 3 is very similar to that of FIGURES 1 and 2, and consequently the following description will be limited to the differences, which will be found in the bias means and retaining means. In this case, in lieu of the spring clip 22, there is employed a cone spring or Belleville washer 62, the outer periphery 63 of which tightly engages the lower faces of the flanges 23, just as did the lugs 21 of the spring clip 22. The washer 62 is forced against the lugs by the coil spring 25, as in the case of the previous embodiment, when the tip of sheathed element 26 is pressed against the bottom of the receptacle.

In this embodiment the insert 41 is not rigidly attached to housing 40, but is allowed to move longitudinally in relation to the housing 40. Keyed slot-and-lug arrangement 53 prevents rotation of the sleeve 41 relative to housing 40. Any other keying arrangement would also be suitable.

When the thermocouple assembly is to be withdrawn from the housing, the handle 64 attached to the mounting block 40 is grasped and the thermocouple assembly pulled upwardly. The periphery 63 of the Belleville washer being held against flanges 23, the washer first flexes and then changes direction of bow, after which it can be withdrawn over the sides of flanges 23.

A new thermocouple assembly to be inserted is simply pushed downwardly with the aid of handle 64 with the Belleville washer bowed in the direction shown in FIGURE 3. The outer periphery of the washer slides over the heads 8 and beneath the flanges 23, whereupon the handle 64 can be released. The thermocouple assembly will then be retained in the housing by the washer 62 which will then be in the position shown in FIGURE 3. In the situation where the thermowell is somewhat shorter than the sheath element 26 requires, the adjustable screw posts 8 may be lengthened. The assembly may then be inverted as above, and the screw posts tightened until the tip of element 26 is directly in contact with the bottom of the thermowell.

Figure 4:
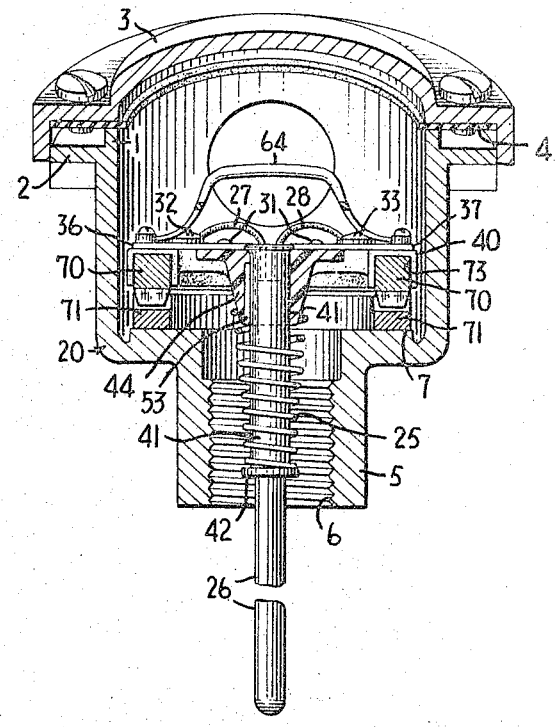
FIGURE 4 is a cross-sectional view of a further embodiment in accordance with the invention, employing a magnet as the bias retaining means.

The embodiment shown in FIGURE 4 employs a pair of permanent magnets to permit quick attachment of the assembly to the housing and quick removal therefrom. The upper magnet 70, which is in the form of an annular ring, is embedded and bonded in a corresponding groove 73 in the mounting block 40. The other magnet 71, also in the form of an annular ring, is mounted on the ledge 7 of the housing 20, and secured thereto by screws (not shown). In this case, the recesses of the mounting block 40 are adjusted to tightly engage the sides of the magnet 71, thus preventing rotation of the thermocouple assembly, and holding it firmly in place in the housing. In addition, by polarizing each magnet along a diameter, the magnetic force field will also prevent rotation. The same effect will be achieved by using two bar magnets as substitutes for each ring magnet with proper polarization of corresponding pairs.

It is possible to substitute other magnetic means for the permanent magnets shown. For example, either one of the magnets may be replaced by a piece of ferromagnetic material, such as soft iron, or the permanent magnets could be electromagnets. When one of the magnetic means is a piece of ferromagnetic material the keyed slot-and-lug arrangement in the abutting faces of the magnetic means may be used to prevent rotation.

To withdraw the thermocouple assembly, all that need be done is to pull the assembly upwardly, using the handle 64. It is similarly replaced, pushing the assembly downwardly into the housing until the magnet 70 is within the field of attraction of the magnet 71, whereupon the assembly snaps into place, and is held there firmly against rotation.

It will be apparent that the thermocouple assemblies in accordance with the invention can be used with drilled thermowells, pipe-type protective tubes, blind receptacles such as bearings and mold blocks, and in fact any type of receptacle employed in this art. No permanent fasteners are required to hold the assemblies in place, and they are quickly and readily removed by a quick snap-in and snap-out motion. They are thus ideally suited for equipment that may be operated at widely varying temperatures. In only a few moments, a given thermocouple element can be removed and replaced with one suited to another temperature range.

In addition, the sensing element is spring-loaded against the bottom of the receptacle, to ensure fast, precise temperature measurement, while the sensing element and the terminal block are spring-loaded, to hold the thermocouple element against rotation. Thus, the element cannot turn accidentally, eliminating the possibility of a breaking in the lead wires or a shorting out during or after installation. The terminal head or housing can be made in a very compact form, with great accessibility to the electrical connections.

The following is claimed:

1. A quickly removable thermocouple assembly comprising, in combination, a mounting block; a temperature sensing element mounted thereon; bias means operatively connected to the mounting block; and retaining means on the bias means, biased thereby to engage a matching retaining portion in a thermocouple housing, the retaining means being movable into and out from engagement with the matching portion of the housing in a quick snap action by application of force to the bias means against the biasing action thereof, to permit quick attachment of the assembly to the housing, biased resilient retention of the assembly in the housing, and quick removal therefrom.

2. A quickly removable thermocouple assembly in accordance with claim 1, wherein the bias means is resiliently attached to the mounting block.

3. A quickly removable thermocouple assembly in accordance with claim 2, wherein a shaft is mounted on the mounting block, and the bias means is resiliently mounted on the shaft.

4. A quickly removable thermocouple assembly in accordance with claim 1, wherein the bias means is a clip spring, and the retaining means are lugs on the spring.

5. A quickly removable thermocouple assembly in accordance with claim 1, wherein the bias means is an annular bowed disc spring, and the retaining means is the outer periphery of the disc.

6. A quickly removable thermocouple assembly comprising, in combination, a mounting block having an aperture therethrough, a tubular insert mounted in the aperture, a temperature sensing element mounted in the insert, and bias means having a retaining means attached and movably mounted on the insert, the retaining means being biased by the bias means to engage a matching portion on a housing for retaining the assembly in the housing.

7. A quickly removable thermocouple assembly in accordance with claim 6, wherein the sensing element is resiliently mounted in the mounting block, whereby said sensing element may thereby be held in a positive contact with the end of the receptacle, whereby the sensing element is grounded.

8. A thermocouple assembly in accordance with claim 6, wherein the bias means is a spring mounted on the insert.

9. A thermocouple assembly in accordance with claim 6 wherein the bias means is a spring clip having outstanding lugs attached for engagement with corresponding lugs of a housing, and upstanding members for manual release and engagement thereof with the housing lugs.

10. A thermocouple assembly in accordance with claim 6, wherein the bias means is an annular disc spring.

References Cited by the Examiner

UNITED STATES PATENTS

| | | | |
|---|---|---|---|
| 1,978,992 | 10/1934 | Donnelly | 73—343 X |
| 2,456,548 | 12/1948 | Weiner et al. | 339—91 X |
| 2,779,810 | 1/1957 | Horbinski | 73—359 X |
| 2,838,935 | 6/1958 | Di Cecia et al. | 73—362 X |
| 2,839,594 | 6/1958 | Schneidersmann | 73—359 X |

LOUIS R. PRINCE, *Primary Examiner.*

D. M. YASICH, *Assistant Examiner.*